(12) United States Patent
Branton et al.

(10) Patent No.: US 9,864,775 B2
(45) Date of Patent: Jan. 9, 2018

(54) QUERY STRENGTH INDICATOR

(71) Applicant: International Business Machines Corporation, Armonk, NY (US)

(72) Inventors: Daniel A. Branton, Austin, TX (US);
Patrick F. Chew, Austin, TX (US);
Joseph G. Keller, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 293 days.

(21) Appl. No.: 14/669,907

(22) Filed: Mar. 26, 2015

(65) Prior Publication Data

US 2016/0283546 A1 Sep. 29, 2016

(51) Int. Cl.
*G06F 17/30* (2006.01)

(52) U.S. Cl.
CPC .. *G06F 17/30398* (2013.01); *G06F 17/30696* (2013.01)

(58) Field of Classification Search
CPC .............. G06F 17/30398; G06F 17/30696
USPC ........................................... 707/766
See application file for complete search history.

(56) References Cited

U.S. PATENT DOCUMENTS

| | | | |
|---|---|---|---|
| 6,460,034 B1 | 10/2002 | Wical | |
| 7,027,975 B1* | 4/2006 | Pazandak | G10L 15/30 704/9 |
| 7,296,021 B2 | 11/2007 | Malkin et al. | |
| 7,685,431 B1* | 3/2010 | Mullany | G06F 21/46 713/182 |
| 7,769,752 B1* | 8/2010 | Turner | G06F 17/30713 707/705 |
| 7,831,582 B1* | 11/2010 | Scofield | G06F 17/30864 707/706 |
| 8,255,388 B1* | 8/2012 | Luo | G06F 17/30463 707/719 |
| 8,370,319 B1* | 2/2013 | Krynski | G06F 17/30693 705/14.54 |
| 8,412,728 B1* | 4/2013 | Roskind | G06F 17/3064 707/767 |
| 8,458,157 B2 | 6/2013 | Alexander | |
| 8,548,973 B1 | 10/2013 | Kritt | |
| 8,560,860 B2 | 10/2013 | Nickell | |
| 8,577,720 B2* | 11/2013 | Baggett | G06Q 10/02 705/14.1 |
| 8,671,106 B1* | 3/2014 | Lee | G06F 17/3087 707/767 |

(Continued)

FOREIGN PATENT DOCUMENTS

WO  0146868 A2  6/2001
WO  2013176593 A1  11/2013

OTHER PUBLICATIONS

Li et al.; "GSLPI: A Cost-Based Query Progress Indicator", Data Engineering (ICDE), 2012 IEEE 28th International Conference on, Apr. 1-5, 2012, pp. 678-689.

(Continued)

*Primary Examiner* — Phuong Thao Cao
(74) *Attorney, Agent, or Firm* — Anthony V.S. England; Reza Sarbakhsh

(57) ABSTRACT

A user interface is presented that is configured for receiving a user search criteria and search filter limit for a search request. An indicator is presented. Presenting the indicator includes changing appearance of the indicator to indicate increasing strength of the search request.

17 Claims, 6 Drawing Sheets

(56) References Cited

U.S. PATENT DOCUMENTS

| | | | |
|---|---|---|---|
| 8,682,924 B2 | 3/2014 | Tao | |
| 8,688,727 B1* | 4/2014 | Das | G06F 17/30528 |
| | | | 707/748 |
| 8,706,750 B2* | 4/2014 | Hansson | G06F 17/3064 |
| | | | 707/731 |
| 8,775,407 B1* | 7/2014 | Huang | G06F 17/30 |
| | | | 707/711 |
| 8,832,138 B2 | 9/2014 | Nurminen et al. | |
| 8,868,539 B2 | 10/2014 | Guha et al. | |
| 8,880,513 B2 | 11/2014 | Sundaresan et al. | |
| 9,213,812 B1* | 12/2015 | Windell | G06F 21/46 |
| 2006/0004734 A1* | 1/2006 | Malkin | G06F 17/30696 |
| 2006/0074870 A1* | 4/2006 | Brill | G06F 17/30651 |
| 2006/0161443 A1* | 7/2006 | Rollins | G06Q 10/087 |
| | | | 702/19 |
| 2007/0006279 A1* | 1/2007 | Brown | G06F 21/31 |
| | | | 726/1 |
| 2007/0036371 A1* | 2/2007 | Buil | G06F 17/3025 |
| | | | 381/312 |
| 2007/0174244 A1* | 7/2007 | Jones | G06F 17/3053 |
| 2008/0097958 A1* | 4/2008 | Ntoulas | G06F 17/30864 |
| 2008/0167973 A1* | 7/2008 | De Marcken | G06F 17/30902 |
| | | | 705/5 |
| 2008/0215557 A1* | 9/2008 | Ramer | G06F 17/30749 |
| 2009/0030893 A1* | 1/2009 | Copps | G06F 17/30867 |
| 2009/0037013 A1* | 2/2009 | Hendler | G05B 19/41875 |
| | | | 700/103 |
| 2009/0083676 A1* | 3/2009 | Flanagan | G06F 17/30554 |
| | | | 715/853 |
| 2009/0299877 A1* | 12/2009 | Vadon | G06F 17/30572 |
| | | | 705/26.1 |
| 2010/0114560 A1* | 5/2010 | Spataro | G06F 21/46 |
| | | | 704/9 |
| 2010/0325101 A1* | 12/2010 | Beal | G06Q 30/02 |
| | | | 707/707 |
| 2011/0034158 A1* | 2/2011 | Bradley | G06Q 10/10 |
| | | | 455/418 |
| 2011/0231223 A1* | 9/2011 | Winters | G06Q 20/10 |
| | | | 705/7.29 |
| 2012/0047025 A1* | 2/2012 | Strohman | G06F 17/3064 |
| | | | 705/14.71 |
| 2012/0047134 A1* | 2/2012 | Hansson | G06F 17/3064 |
| | | | 707/731 |
| 2012/0102008 A1* | 4/2012 | Kaariainen | G06Q 30/0201 |
| | | | 707/705 |
| 2012/0150837 A1* | 6/2012 | Radlinski | G06F 17/30864 |
| | | | 707/708 |
| 2012/0209870 A1* | 8/2012 | Chowdhury | G06F 17/30657 |
| | | | 707/766 |
| 2012/0278314 A1* | 11/2012 | Sundaresan | G06F 17/3053 |
| | | | 707/723 |
| 2012/0330989 A1* | 12/2012 | Tan | G06F 17/289 |
| | | | 707/760 |
| 2013/0046601 A1* | 2/2013 | Skelton | G06Q 30/0256 |
| | | | 705/14.25 |
| 2013/0054555 A1* | 2/2013 | Guha | G06F 17/30873 |
| | | | 707/706 |
| 2013/0332715 A1* | 12/2013 | Bonanno | G06F 9/3806 |
| | | | 712/240 |
| 2014/0059069 A1* | 2/2014 | Taft | G06F 17/30442 |
| | | | 707/765 |
| 2014/0136503 A1 | 5/2014 | Kritt et al. | |
| 2014/0149373 A1 | 5/2014 | Annau et al. | |
| 2014/0181135 A1 | 6/2014 | Hansson et al. | |
| 2014/0280180 A1 | 9/2014 | Edecker et al. | |
| 2014/0337346 A1 | 11/2014 | Barthel et al. | |
| 2014/0372405 A1* | 12/2014 | Lee | G06F 17/30864 |
| | | | 707/711 |
| 2015/0026167 A1* | 1/2015 | Neels | G06F 17/30867 |
| | | | 707/723 |
| 2015/0123983 A1* | 5/2015 | Schoening | A61B 3/032 |
| | | | 345/589 |
| 2015/0143509 A1* | 5/2015 | Selander | G06F 21/46 |
| | | | 726/18 |
| 2015/0195051 A1* | 7/2015 | Hutchings | G01S 5/0257 |
| | | | 455/41.3 |
| 2015/0310204 A1* | 10/2015 | Pruthi | G06F 21/46 |
| | | | 726/25 |
| 2015/0317320 A1* | 11/2015 | Miller | G06F 17/3053 |
| | | | 707/728 |
| 2016/0048561 A1* | 2/2016 | Jones | G06F 17/30477 |
| | | | 707/722 |

OTHER PUBLICATIONS

Mishra et al.; "A Lightweight Online Framework for Query Progress Indicators", Data Engineering (ICDE), 2007 IEEE 23th International Conference on, Apr. 15-20, 2007, pp. 1292-1296.

Lin et al.; "Selecting Semantically-Resonant Colors for Data Visualization", EuroVis'13, Proceedings of the ACM 15th Eurographics Conference on Visualization, vol. 32, No. 3, Jun. 17-21, 2013, Leipzig, German, pp. 401-410.

Kim et al.; "Characterizing Queries in Different Search Tasks", System Science (HICSS), 2012 IEEE 45th Hawaii International Conference on, Jan. 4-7, 2012, pp. 1697-1706.

* cited by examiner

QUERY STRENGTH INDICATOR

BACKGROUND

Increasing use of big data and large scale analytics in technology results in massive sets of data that provide numerous challenges. For example, in order to provide a holistic view of an organization's information technology ("IT") security, the organization's voluminous security logs may be curated over time from many network devices and searched by one or more security information and event management ("SIEM") service.

SUMMARY

A method includes presenting a user interface configured for receiving a user search criteria and search filter limit for a search request. An indicator is presented. Presenting the indicator includes changing appearance of the indicator to indicate increasing strength of the search request.

System and computer program products relating to the above-summarized method are also described and claimed herein.

BRIEF DESCRIPTION OF THE DRAWINGS

The above described aspects of the present invention and others, including objects, forms, features and advantages, will become more apparent from the following detailed description of illustrative embodiments thereof, which is to be read in connection with the accompanying drawings. The drawings are not to scale and are, together with the detailed description, for clarity in facilitating the understanding of persons skilled in the related art. In the drawings.

DETAILED DESCRIPTION

Detailed embodiments of the present invention are disclosed herein to illustrate claimed structures and methods. This invention may, however, be embodied in many different forms and should not be construed as limited to the exemplary embodiments disclosed herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention involve recognition that certain issues may arise and be addressed in the use of big data and large scale analytics. For example, non-filtered searches of security logs by a SIEM service may require hours or days to complete. Further, since IT resources are shared among users, performing such a search for one user may affect IT services for other users. In a context such as this and others, embodiments of the present invention involve recognition that users are not always informed about search filtering options and, therefore, may be unaware of the benefits filters may offer for improving speed and quality of a keyword-match search over a large, multi-faceted network of data sets. Further, even when filtering options are presented, the potential that the filtering offers may not be apparent. The filters may tend to seem optional and of little significance. Users may not be given feedback showing how search filtering impacts themselves and others who are sharing their IT resources. As a result, users tend to neglect filtering. System administrators receive complaints about slow searches and must stop offending searches.

System administrators may further identify users who made such a search and may work to improve the way each user performs searching. However, this is time consuming and inefficient. Embodiments of the present invention provide a query strength indicator, which indicates to a user the effectiveness and strength of a search request entered by the user. The feedback provided by this indicator tends to improve the quality of the user's search over a specific payload. Merely allowing a user to limit the scope of a search before the user invokes the search does not accomplish or suggest providing an indicator that visually encourages a user to initially limit the search. By visually encouraging users in this fashion, this tends to reduce IT resources that must be devoted to searches.

Figure 1:
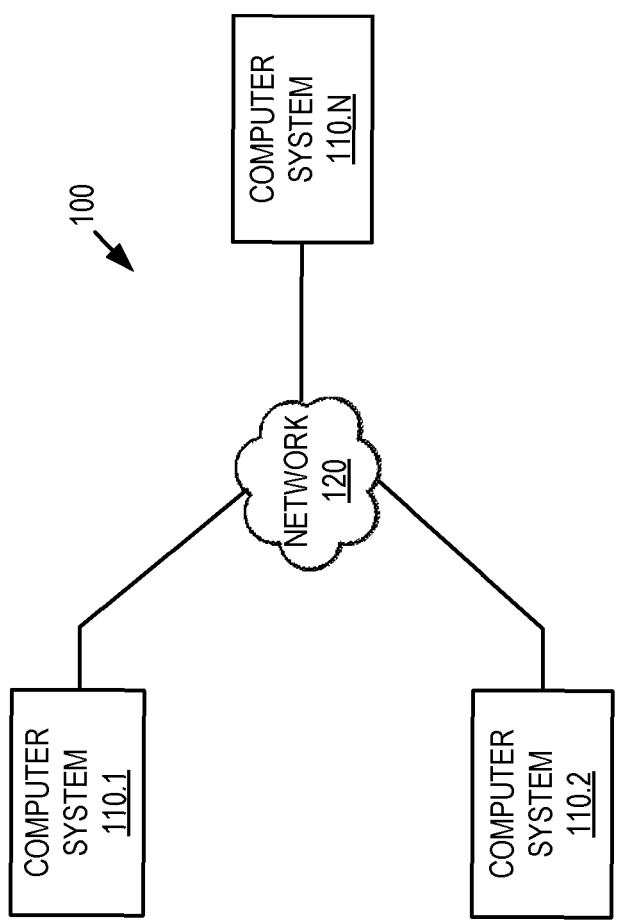
FIG. 1 illustrates a networked computer environment, according to embodiments of the present invention.

FIG. 1 illustrates an example computing environment 100, according to embodiments of the present invention. As shown, computing environment 100 includes computer systems 110.1, 110.2 through 110.N connects via network 120, which may be public or private. Systems 110.1, 110.2, etc. include modules, which may be program or hardware modules, configured to perform tasks for their own respective systems or for other systems or both.

Figure 2:
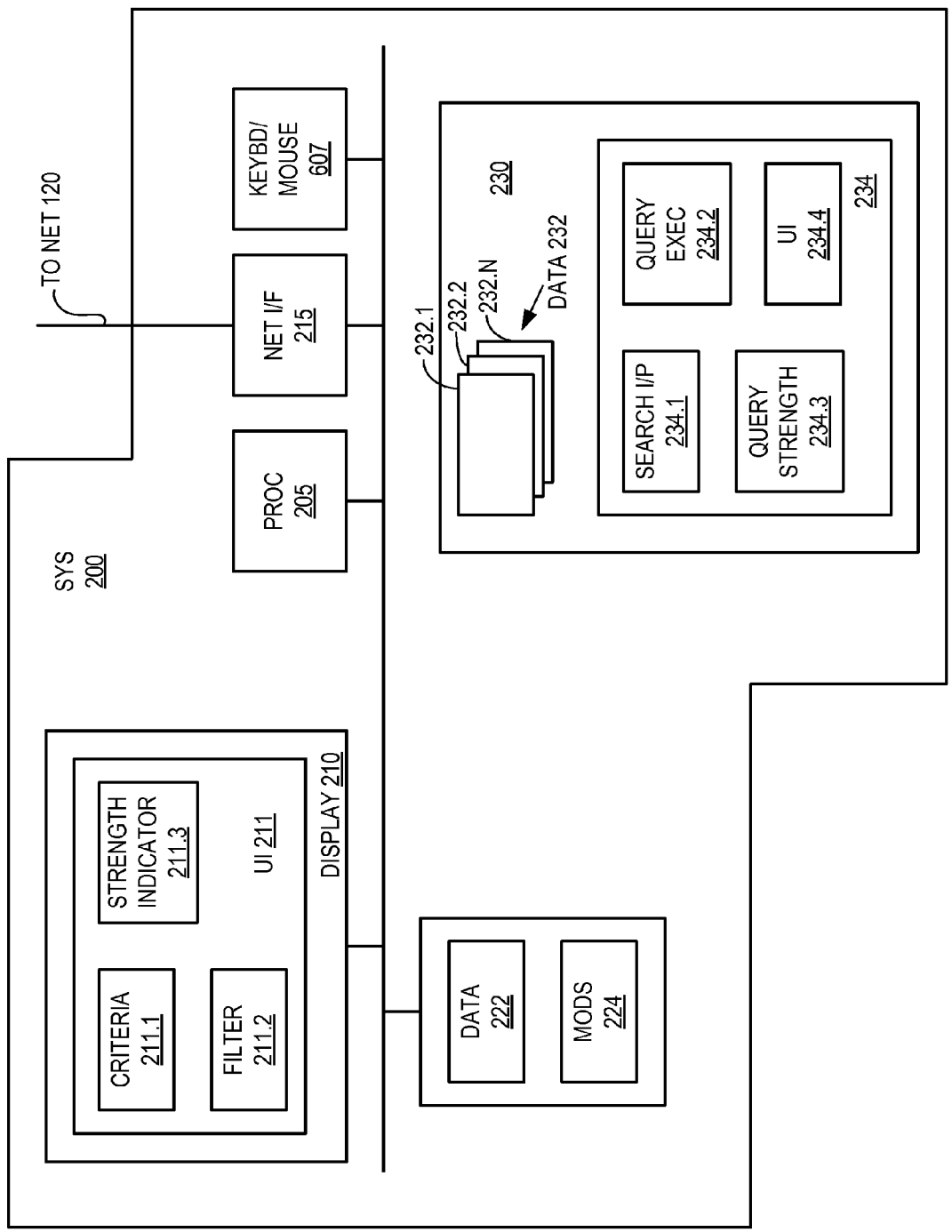
FIG. 2 is a block diagram of devices shown in FIG. 1, according to embodiments of the present invention.

FIG. 2 illustrates a system 200, which may be applied as any or all of computer systems 110.1, 110.2, etc., according to embodiments of the present invention. As shown, system 200 includes a central processing unit (CPU) 205, a display 210, a network interface 215, an interconnect (i.e., bus) 217, a memory 220, and storage 230. CPU 205 may retrieve and execute programming instructions stored in memory 220. Similarly, CPU 205 may retrieve and store application data residing in memory 220. Interconnect 217 may facilitate transmission, such as of programming instructions and application data, among CPU 205, storage 230, network interface 215, and memory 220. CPU 205 is included to be representative of a single CPU, multiple CPUs, a single CPU having multiple processing cores, and the like. Additionally, memory 220 is representative of a random access memory, which includes data and program modules for run-time execution, such as example data 222 and module 224 shown, according to embodiments of the present invention. However, it should be understood that one or more of modules, such as module 224, may be implemented by other hardware and may be firmware.

Data 222 and module 224 may be instances of data and program modules from storage 230, such as example data 232 and module 234 shown, for run-time execution by CPU 205 in memory 220. Data and program modules in storage 230 may include database tables and one or more query execution modules. Storage 230 may be a disk drive storage device, for example. Although shown as a single unit, storage 230 may be a combination of fixed and/or removable storage devices, such as fixed disc drives, floppy disc drives, tape drives, removable memory cards or optical storage, network attached storage (NAS), or a storage area-network (SAN).

A user enters search criteria and search filter limitations in user interface 211 for searching a data set, such as data 232 shown on system 200 or data which may be elsewhere, such as on one or more of systems 110.1-110.N. The user enters the search criteria via interface aspect 211.1 and enters the search filter limitations via interface aspect 211.2, according to embodiments of the present invention, which may be by entering text or preselected choices. That is, search criteria interface aspect 211.1 and search filter interface aspect 211.2 may each include a text entry box, which is a type of graphical control element for receiving input from a user, or a list box (also known as a "drop-down list"), which is another type of graphical control element that is for receiving a user selection of predetermined items, or a combo box, which is a combination of a text entry box and a list box. Alternatively, a single interface aspect is provided for both search criteria and search filter limitation entry and the user enters any or all of text, preselected criteria and preselected filter limitations for both search criteria and search filter limitations via the single interface aspect, according to embodiments of the present invention. For example, the user may enter search criteria as text and may select predetermined filter limitations from a list box. Or the user may enter search criteria and filter limitations both as text and also select one or more additional predetermined filter limitations from a list box.

A search input processing module 234.1 receives and uses those criteria and limitations to generate a query, which may be in a language such as SQL. The query is executed by a query execution module 234.2. A strength indicator 211.3 in user interface 211 helps the user learn about the data 232 and create more intelligent and efficient queries for searching it. Consequently, users become more proficient at crafting specific, efficient queries that give them relevant search results. Correspondingly, resources of systems 110.1-110.N are more available to all users, since those resources are being used more economically. Because the indicator helps the user consistently craft effective queries, it is referred to herein as a "query strength indicator." However, it may also be referred to as a "search strength indicator."

Figure 3:
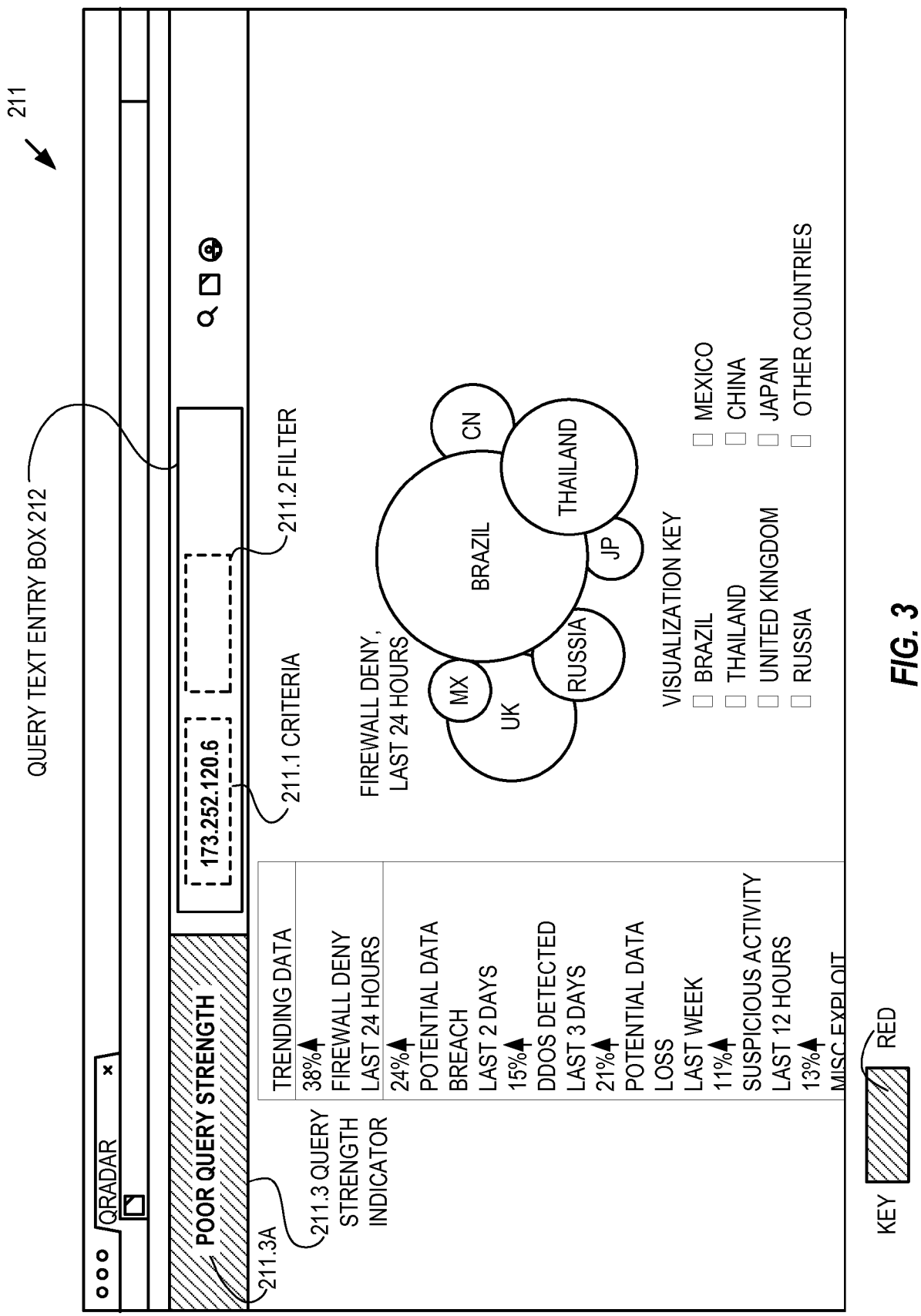
FIG. 3 illustrates certain details of a user interface with a query strength indicator that indicates weak query strength, according to embodiments of the present invention.
Figure 4:
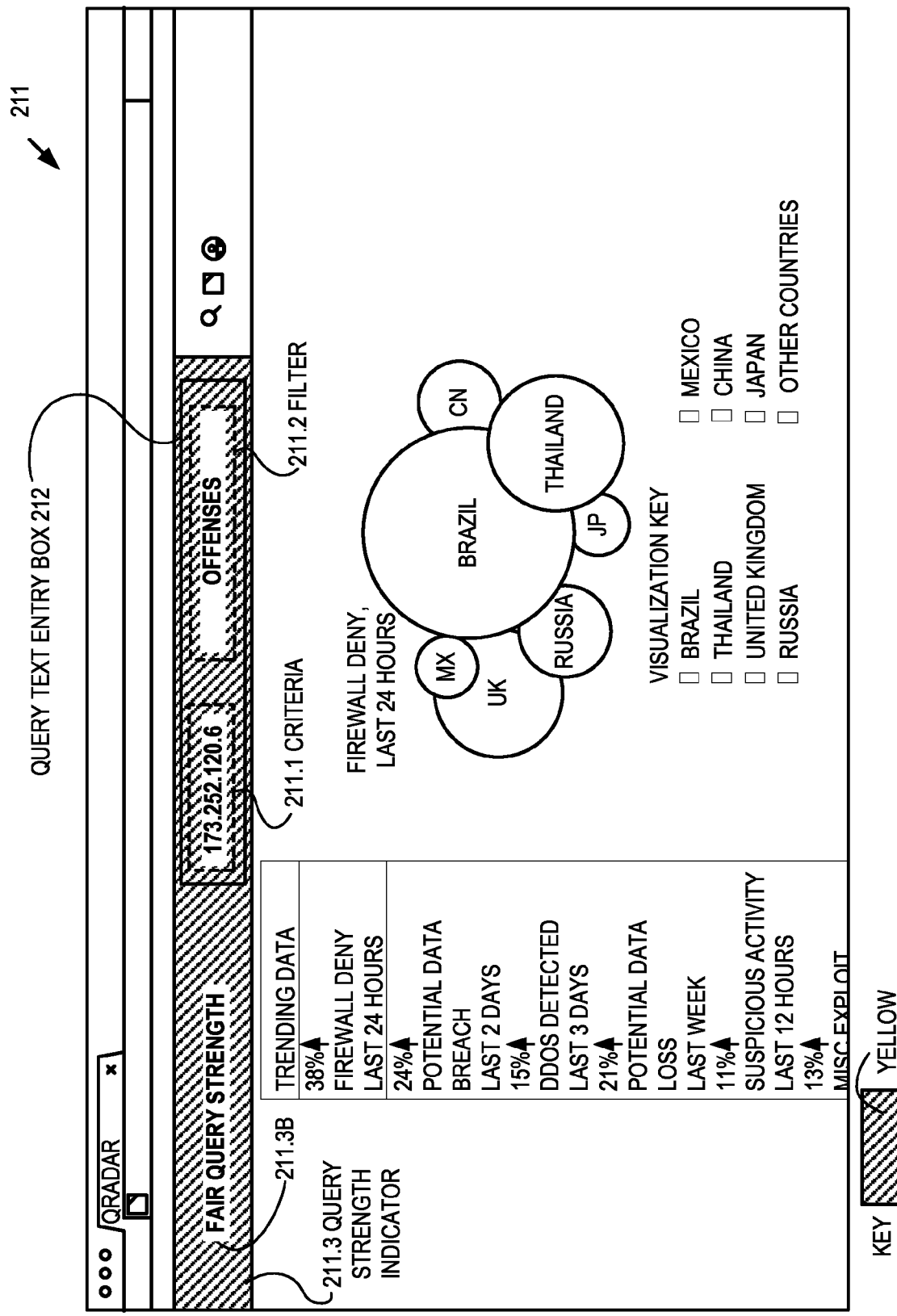
FIG. 4 illustrates certain details of a user interface with additional search input and a query strength indicator that indicates somewhat stronger query strength, according to embodiments of the present invention.
Figure 5:
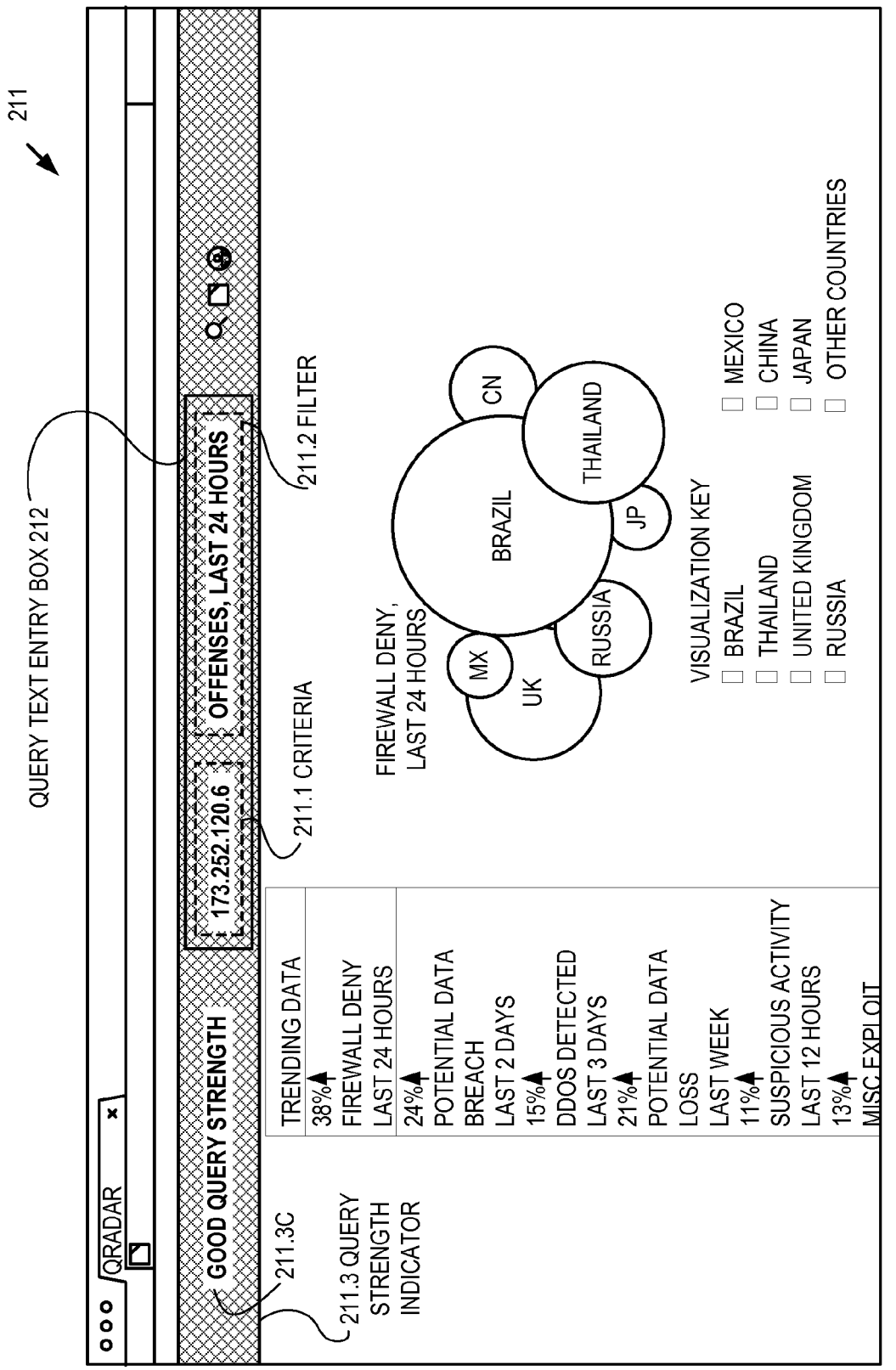
FIG. 5 illustrates certain details of a user interface with still more search input and a query strength indicator that indicates a still stronger query strength, according to embodiments of the present invention.

Referring now to FIG. 3 through 5 along with FIGS. 1 and 2, an embodiment of user interface 211 is shown in more detail, including search criteria interface aspect 211.1 and search filter interface aspect 211.2. Search criteria interface aspect 211.1 is for receiving, as search criteria, user-specified text for a query execution module 234.2 to find. Search filter interface aspect 211.2 is for receiving one or more user specified limits for the search criteria. In response to receiving from the user an increasing amount of search criteria or search filter limitation or both, query strength indicator 211.3 provides a graphic indicator that changes appearance to show increasing strength of the query that will be correspondingly produced. The search strength indicator 211.3 may be implemented with current front-end web technologies including HTML to display the indicator, CSS to style and animate the indicator, and Javascript to detect and act upon search input.

FIGS. 3 through 5 show user interface 211 at times when the user has entered search criteria, one or more search filter limits, or both and prior to the user requesting that performance of the search should start, which the user may do by pressing the <enter> key after entering search criteria, one or more search filter limits, or both.

Continuing with the example introduced herein above about searching security logs by a SIEM service, in this context a search term, i.e., search criteria 211.1, may be merely an IP address, for example, such as "173.252.120.6," in FIG. 3. In general, "search criteria" may be free-form text the user enters as one or more terms that the user wants query execution module 234.2 to find, according to embodiments of the present invention.

A search filter limitation, according to embodiments of the present invention, is a limitation for a query that specifies what data 232 query execution module 234.2 must search through to find the query terms or that limits how many records of data 232 query execution module 234.2 must search through or both. Search filter interface aspect 211.2 may include predetermined search filter limitations for the user to select in order to limit a search, according to embodiments of the present invention. For an SIEM service, the data set 232 that is searched includes a voluminous set of security logs containing information about security events on a network over time. For this kind of data 232, search filter aspect 211.2 may provide predetermined, selectable, time-based limits, such as "only for logs within the last two hours." Search filter aspect 211.2 may likewise provide event-based limits, such as "only logs for 'offenses'" and such as "only logs for 'firewall deny' events" and such as "only logs for 'vulnerabilities'." Search filter aspect 211.2 may likewise provide data structure-based limits, such as "packets," "half A of the data set," and "half B of the data set." FIG. 4 illustrates an instance wherein "173.252.120.6" is included in the query as a search criteria 211.1, as in FIG. 3, but in FIG. 4 the query also includes "Offenses" as a search filter limitation 211.2, which further limits the query to only logs for "offenses." FIG. 5 illustrates an instance wherein "173.252.120.6" is included in the query as a search criteria 211.1 and "Offenses" is included as a search filter limitation 211.2, as in FIG. 4, but in FIG. 5 the query also includes "Last 24 hours" as a search filter limitation 211.2, which further limits the query to only logs occurring in the last 24 hours.

The data set 232 that is searched may vary widely, but it is generally common that records 232.1, 232.2, etc. in a data set 232 are categorized in such a way that a search filter may limit the number of records 232.1, 232.2, etc. that must be searched. In another instance, data set 232 could be a database of information about inventory, where input from search filter aspect 211.2 may limit the search to products of a particular type. The data set 232 could be a database of airline flights, where input from search filter aspect 211.2 may limit the search to flights of a particular type, such as discount flights, and flights from a particular departure location to a particular destination. The data set 232 could be a database of credit card or other financial transactions, where input from search filter aspect 211.2 may limit the search to transactions of a particular type, such as charges, payments, withdrawals, deposits, etc.

Query strength is affected by both search terms and filter limits, according to embodiments of the present invention. To determine the effect, search input processing module 234.1 communicates to a query strength module 234.3 the filter limitations, search criteria and data set 232 records 232.1, 232.2, etc. targeted by the input received from the user via search criteria interface aspect 211.1 and search filter aspect 211.2. Query strength module 234.3 uses this input as a basis to determine a resource expense for executing the query, which may include one or more of processor 205 cycles, storage 230 access time or usage, network bandwidth consumed, overall elapsed time for execution of the query, etc. Query strength module 234.3 may calculate expense in different ways, according to different embodiments of the present invention. In general, the expense is basically measured in time and performance. One way that query strength module 234.3 may calculate expense is to lookup stored records of actual time taken recently by a similar search. Other ways of calculating resource expense for executing a query are well known.

Once query strength module 234.3 determines resource expense, it provides this to interface module 234.4, which visually represented the expense as query strength indicator 211.3 in user interface 211. This may be shown near the search criteria interface aspect 211.1, or even superimposed thereon, according to embodiments of the present invention.

According to embodiments of the present invention in which query strength is indicated by words, module 234.3 generates a query strength indicator 211.3 that presents the word "weak" or the word "poor" 211.3A, for example, responsive to receiving only one search term and no filter. Module 234.3 generates a quality query strength indicator 211.3 that presents the word "decent," "fair" or "good" 211.38, for example, responsive to receiving only one search term and one filter, for example. Module 234.3 generates a quality query strength indicator 211.3 that presents the word "strong" or "excellent" 211.3C, for example, responsive to receiving only one search term and two filters, for example.

According to embodiments of the present invention in which length of a graphic bar indicates strength, responsive to receiving only one search term and no filter, module 234.3 generate a corresponding quality query strength indicator 211.3 that is ⅓ of full length, for example. Responsive to receiving only one search term and one filter, for example, module 234.3 generates a corresponding quality query strength indicator 211.3 that is ⅔ of full length, for example. Responsive to receiving only one search term and two filters, for example, module 234.3 generates a corresponding quality query strength indicator 211.3 that that is full length, for example.

Module 234.3 may also generate varying numbers instead of or, in addition to, the varying lengths of graphic bar. For example, module 234.3 may generate and display "33%" with or instead of the ⅓ length bar, "66%" with or instead of the ⅔ length bar and "100%" with or instead of the full length bar.

According to embodiments of the present invention wherein color of a graphic indicator signals strength, responsive to receiving only one search term and no filter, module 234.3 generate a corresponding quality query strength indicator 211.3 that is red, for example. Responsive to receiving only one search term and one filter, for example, module 234.3 generates a corresponding quality query strength indicator 211.3 that is yellow, for example. Responsive to receiving only one search term and two filters, for example, module 234.3 generates a corresponding quality query strength indicator 211.3 that that is green, for example.

Alternatively, a graphic element instead of a bar may indicate strength, such as a circle, wherein graphic element changes in size or color or both. Also, or alternatively, a greater portion of the graphic element may be filled in to indicate more strength, so that, for example, an empty, white circle with red boundary line is presented for a weak query strength, a circle that is partially filled with yellow and that has a yellow boundary line is presented for fair query strength, and a circle that is completely filled with green and that has a green boundary line is presented for good query strength. In addition to changing in fill color or boundary line color or both, the circle may also progressively increase in size to indicate greater strength. Also, the shape of the graphic indicator may progressively change to indicate increasing strength. For example, the shape may progressively change from one geometric type to another. Also, the graphic indicator may progressively change from being more pixilated to less pixilated in order to indicate increasing strength, so that the graphic indicator provides a progressively clearer image. Herein such a change in pixilation may be referred to as a change in shape.

It should be appreciated that the query strength indicator 211.3 may be shown by any or all of a graphic indicator, numeric indictor and word indicator. In the illustrated embodiment of FIGS. 3-5, indicator 211.3 is shown as a query strength indicator bar that increases in length and also changes color and changes descriptive words as more search criteria and filter limits are entered, which may include entries that are selected from predetermined choices. This encourages the user to apply at least a combination of three search terms and filter limits. This provides a faster and less expensive search, because each additional filter limitation reduces the amount of full payload to search relative to the amount that would be searched if no filter limits were applied.

Figure 6:
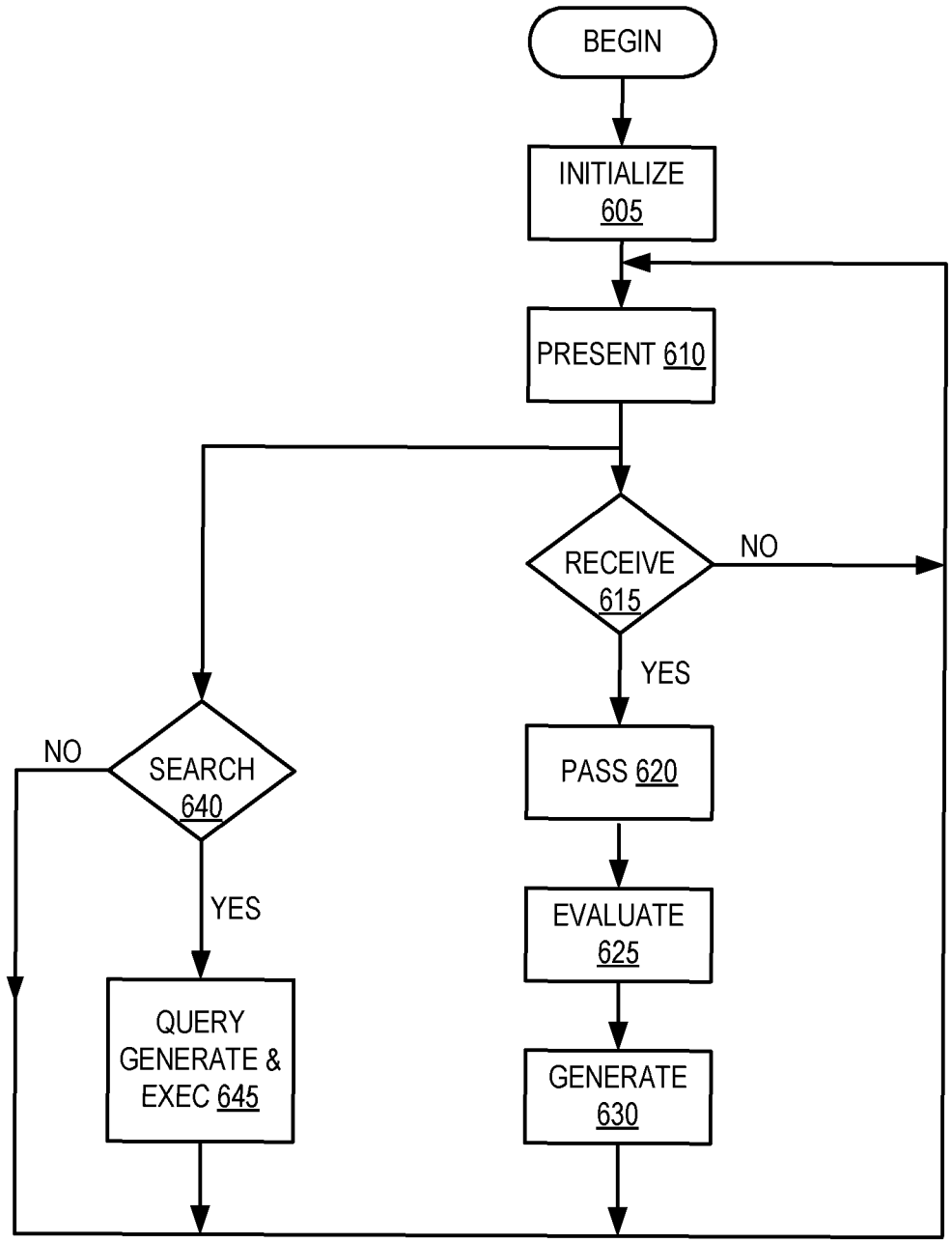
FIG. 6 illustrates certain process aspects, according to embodiments of the present invention.

Referring now to flowchart FIG. 6, an example process is shown, according to embodiments of the present invention. At 605, before input is received query strength indicator is initialized to indicate the weakest possible strength, since no input has yet been received. At 610, search filter interface aspect and search criteria interface aspect are presented by a user interface module to the user along with the current query strength indicator. At 615, an input module receives user entered search criteria and search filter limitations or else branches back to wait for input. Upon receiving input, at 620, input module passes the input to a query strength module, which evaluates 625 the received search input, generates 630 an update to the strength value and passes the updated value to the user interface module to present 610 the updated strength indicator. Meanwhile, input module checks at 640 for whether the user has signaled to the interface that the received input is ready for query generation and execution, which the user may signal such as by input of an <enter> key on a keyboard or selection of a search icon, which the user does after entering the search criteria and any filter limits and after observing the resulting change in indicator 211.3. If yes, the query execution module generates and executes 645 a query from the received input and sends the query result to the interface module for presentation 610 to the user.

The disclosed arrangement works to change a sequence of operations. Instead of filtering results after searching, the strength indicator prompts users to filter before users initiate their searches. That is, responsive to a user entering search criteria or filter limitations or both, query strength module immediately updates the query strength indicator, without waiting for the user to request that the search be initiated. Since the query strength indicator is updated before the search is begun, this informs the user about how additional input from the user can cause the search to use fewer resources and happen more quickly.

The above-described examples and depictions in the Figures are not meant to imply architectural limitations. For example, any of devices 110.1, 110.2, etc. may be a notebook computer, hand held computer, smart phone, kiosk, etc. Further, the present invention may reside on any data storage medium (i.e., floppy disk, compact disk, hard disk, tape, ROM, RAM, etc.) used by a computer system. (The terms "computer," "system," "computer system," and "data processing system" are used interchangeably herein.)

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

One or more databases may be included in a host for storing and providing access to data for the various implementations. One skilled in the art will also appreciate that, for security reasons, any databases, systems, or components of the present invention may include any combination of databases or components at a single location or at multiple locations, wherein each database or system includes any of various suitable security features, such as firewalls, access codes, encryption, de-encryption and the like.

The database may be any type of database, such as relational, hierarchical, object-oriented, and/or the like. A database product that may be used to implement the databases is IBM® DB2®, or other available database products. (IBM and DB2 are trademarks of International Business Machines Corporation, registered in many jurisdictions worldwide.) The database may be organized in any suitable manner, including as data tables or lookup tables.

Association of certain data may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function, for example, using a key field in each of the manufacturer and retailer data tables. A key field partitions the database according to the high-level class of objects defined by the key field. For example, a certain class may be designated as a key field in both the first data table and the second data table, and the two data tables may then be merged on the basis of the class data in the key field. In this embodiment, the data corresponding to the key field in each of the merged data tables is preferably the same. However, data tables having similar, though not identical, data in the key fields may also be merged by using AGREP, for example.

The host may provide a suitable website or other internet-based graphical user interface accessible by users. In one embodiment, Netscape web server, IBM® Websphere® Internet tools suite, an IBM DB2, universal database platform and a Sybase database platform are used in conjunction with a Sun Solaris operating system platform. (IBM and WebSphere are trademarks of International Business Machines Corporation, registered in many jurisdictions worldwide.) Additionally, components such as JBDC drivers, IBM connection pooling and IBM MQ series connection methods may be used to provide data access to several sources. The term webpage as it is used herein is not meant to limit the type of documents and applications that might be used to interact with the user. For example, a typical website might include, in addition to standard HTML documents, various forms, Java applets, Javascript, active server pages (ASP), Java Server Pages (JSP), common gateway interface scripts (CGI), extensible markup language (XML), dynamic HTML, cascading style sheets (CSS), helper applications, plug-ins, and the like.

While this specification contains many specifics, these should not be construed as limitations on the scope of the invention or of what can be claimed, but rather as descriptions of features specific to particular implementations of the invention. Certain features that are described in this specification in the context of separate implementations can also be implemented in combination in a single implementation. Conversely, various features that are described in the context of a single implementation can also be implemented in multiple implementations separately or in any suitable sub combination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

Those skilled in the art having read this disclosure will recognize that changes and modifications may be made to the embodiments without departing from the scope of the present invention.

It should be appreciated that the particular implementations shown and described herein are illustrative of the invention and its best mode and are not intended to otherwise limit the scope of the present invention in any way. Other variations are within the scope of the following claims.

The actions recited in the claims can be performed in a different order and still achieve desirable results. Likewise, the processes depicted in the accompanying figures do not necessarily require the particular order shown, or sequential order, to achieve desirable results. In certain implementations, multitasking and parallel processing can be advantageous.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims.

As used herein, the terms comprises, comprising, or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as essential or critical.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
presenting a user interface configured for receiving user search inputs for a search request; and
presenting an indicator on the user interface, including changing appearance of the indicator responsive to receiving at least one user search input selected from the group consisting of search criteria and search filter limits, where the changing appearance occurs before receiving a user request to start performing the search and indicates increasing search strength of the search request by changing the appearance of the indicator from a first search strength indication to a second search strength indication responsive to receiving an additional one of the user search inputs, where the second search strength indication indicates a stronger search strength than the first search strength indication, so that the presenting of the indicator shows a user an effectiveness of the search request received from the user and encourages the user to apply more of the user search inputs in order to reduce computer resource expense for executing the search.

2. The method of claim 1, wherein presenting the changed appearance of the indicator includes presenting a changed size of a graphic element, a changed color of a graphic element, a changed shape of a graphic element and/or a changed word.

3. The method of claim 1, wherein presenting the user interface includes presenting a graphical control element configured for receiving both the search criteria and at least one search filter limit.

4. The method of claim 1, wherein presenting the user interface includes presenting a graphical control element providing a predetermined, selectable, time-based limit, event-based limit and/or data structure-based limit.

5. The method of claim 1, comprising:
determining a resource expense for performing the search, wherein presenting the indicator includes presenting a representation of the resource expense.

6. The method of claim 1, wherein presenting the indicator includes presenting a full length indicator bar responsive to receiving one search criteria and two filter limitations, presenting a two thirds length indicator bar responsive to receiving one search criteria and one filter limitation and presenting a one third length indicator bar responsive to receiving one search criteria and no filter limitation.

7. A system comprising:
a processor; and
a computer readable storage medium connected to the processor, wherein the computer readable storage medium has stored thereon a program for controlling the processor, and wherein the processor is operative with the program to execute the program for:
presenting a user interface configured for receiving user search inputs for a search request; and
presenting an indicator on the user interface, including changing appearance of the indicator responsive to receiving at least one user search input selected from the group consisting of search criteria and search filter limits, where the changing appearance occurs before receiving a user request to start performing the search and indicates increasing search strength of the search request by changing the appearance of the indicator from a first search strength indication to a second search strength indication responsive to receiving an additional one of the user search inputs, where the second search strength indication indicates a stronger search strength than the first search strength indication, so that the presenting of the indicator shows a user an effectiveness of the search request received from the user and encourages the user to apply more of the user search inputs in order to reduce computer resource expense for executing the search.

8. The system of claim 7, wherein presenting the changed appearance of the indicator includes presenting a changed size of a graphic element, a changed color of a graphic element, a changed shape of a graphic element and/or a changed word.

9. The method of claim 7, wherein presenting the user interface includes presenting a graphical control element configured for receiving both the search criteria and at least one search filter limit.

10. The system of claim 7, wherein presenting the user interface includes presenting a graphical control element providing a predetermined, selectable, time-based limit, event-based limit and/or data structure-based limit.

11. The system of claim 7, wherein the processor is operative with the program to execute the program for:
determining a resource expense for performing the search, wherein presenting the indicator includes presenting a representation of the resource expense.

12. The system of claim 7, wherein presenting the indicator includes presenting a full length indicator bar responsive to receiving one search criteria and two filter limitations, presenting a two thirds length indicator bar responsive to receiving one search criteria and one filter limitation and presenting a one third length indicator bar responsive to receiving one search criteria and no filter limitation.

13. A computer program product including a non-transitory computer readable storage medium having instructions stored thereon for execution by a computer system, wherein the instructions, when executed by the computer system, cause the computer system to implement a method comprising:
presenting a user interface configured for receiving user search inputs for a search request; and
presenting an indicator on the user interface, including changing appearance of the indicator responsive to receiving at least one user search input selected from the group consisting of search criteria and search filter limits, where the changing appearance occurs before receiving a user request to start performing the search and indicates increasing search strength of the search request by changing the appearance of the indicator from a first search strength indication to a second search strength indication responsive to receiving an additional one of the user search inputs, where the second search strength indication indicates a stronger search strength than the first search strength indication, so that the presenting of the indicator shows a user an effectiveness of the search request received from the user and encourages the user to apply more of the user search inputs in order to reduce computer resource expense for executing the search.

14. The computer program product of claim 13, wherein presenting the changed appearance of the indicator includes presenting a changed size of a graphic element, a changed color of a graphic element, a changed shape of a graphic element and/or a changed word.

15. The computer program product of claim 13, wherein presenting the user interface includes presenting a graphical control element configured for receiving both the search criteria and at least one search filter limit.

16. The computer program product of claim 13, wherein presenting the user interface includes presenting a graphical control element providing a predetermined, selectable, time-based limit, event-based limit and/or data structure-based limit.

17. The computer program product of claim 13, Wherein presenting the indicator includes presenting a full length indicator bar responsive to receiving one search criteria and two filter limitations, presenting a two thirds length indicator bar responsive to receiving one search criteria and one filter limitation and presenting a one third length indicator bar responsive to receiving one search criteria and no filter limitation.

* * * * *